United States Patent
Köster et al.

(10) Patent No.: US 11,937,353 B2
(45) Date of Patent: Mar. 19, 2024

(54) DEVICE AND METHOD FOR IMPLEMENTING A CONNECTED LIGHTING SYSTEM

(71) Applicant: SIGNIFY HOLDING B.V., Eindhoven (NL)

(72) Inventors: Rudi Johannes Leonard Köster, Eindhoven (NL); Remco Magielse, Tilburg (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 221 days.

(21) Appl. No.: 17/630,038

(22) PCT Filed: Jul. 28, 2020

(86) PCT No.: PCT/EP2020/071290
§ 371 (c)(1),
(2) Date: Jan. 25, 2022

(87) PCT Pub. No.: WO2021/018901
PCT Pub. Date: Feb. 4, 2021

(65) Prior Publication Data
US 2022/0272817 A1    Aug. 25, 2022

(30) Foreign Application Priority Data
Aug. 1, 2019  (EP) .................... 19189520

(51) Int. Cl.
*H05B 47/155*  (2020.01)
*H05B 47/11*  (2020.01)

(52) U.S. Cl.
CPC .......... *H05B 47/155* (2020.01); *H05B 47/11* (2020.01)

(58) Field of Classification Search
None
See application file for complete search history.

(56) References Cited

U.S. PATENT DOCUMENTS

| 2017/0303370 | A1* | 10/2017 | Pijlman | H05B 47/155 |
| 2018/0227204 | A1 | 8/2018 | Magielse, Sr. et al. | |
| 2018/0235039 | A1 | 8/2018 | Krajnc et al. | |
| 2018/0249306 | A1* | 8/2018 | Pandharipande | H04Q 9/00 |
| 2019/0166676 | A1 | 5/2019 | Maeda et al. | |
| 2019/0215931 | A1* | 7/2019 | Magielse | H05B 47/125 |

(Continued)

FOREIGN PATENT DOCUMENTS

WO    2016001780 A1    1/2016

*Primary Examiner* — Wilson Lee (57) ABSTRACT

According to one aspect disclosed herein, there is provided a first lighting device for use in a lighting system, the lighting system comprising one or more lighting devices for illuminating an environment, the first lighting device is configured to perform, upon becoming active from a dormant state, the operations of: polling one or more neighboring lighting devices to determine whether they are part of a lighting scene being output by the lighting system and if so determining information about the lighting scene based on the polling; determining whether the first lighting device is part of the lighting scene; and based on the determined scene and the determination that the first lighting device is part of that lighting scene, ascertaining one or more lighting settings of the first lighting device and a light output to be rendered by the lighting device in order to join the scene.

13 Claims, 2 Drawing Sheets

(56) References Cited

U.S. PATENT DOCUMENTS

| | | | |
|---|---|---|---|
| 2020/0045796 A1* | 2/2020 | Deixler | G06V 20/00 |
| 2020/0170093 A1* | 5/2020 | Mirsky | F21S 8/085 |
| 2021/0092819 A1* | 3/2021 | Murthy | H05B 47/11 |
| 2021/0176844 A1* | 6/2021 | Olaleye | H04L 12/4625 |
| 2021/0199498 A1* | 7/2021 | Tsesmelis | G01J 1/0228 |

* cited by examiner

DEVICE AND METHOD FOR IMPLEMENTING A CONNECTED LIGHTING SYSTEM

CROSS-REFERENCE TO PRIOR APPLICATIONS

This application is the U.S. National Phase application under 35 U.S.C. § 371 of International Application No. PCT/EP2020/071290, filed on Jul. 28, 2020, which claims the benefit of European Patent Application No. 19189520.0, filed on Aug. 1, 2019. These applications are hereby incorporated by reference herein.

TECHNICAL FIELD

The present disclosure relates to controlling the light output of a lighting device within a connected lighting system.

BACKGROUND

In recent years, LED-based lighting solutions have been developed. These are able to provide additional features, above and beyond those of traditional lighting (e.g. incandescent, CFL) technologies. These include, among others, the possibility of tuning the color temperature (e.g. from warm white to cool white) and/or creating a large gamut of colors. For example, the Philips Hue family of products allow for both options: temperature tuning from 2200K to 6500K and around 16 million possible color combinations.

One of the main drivers for this development is allowing customers to go beyond the common use of lighting (either fixed brightness or dimmable brightness) and use these lamps for what is known as mood setting: to adapt the lighting in a specific room to match certain decoration, use color combinations to highlight areas and hide others, increase the feeling of warmth or induce higher concentration or energy in users, etc.

A lighting system for illuminating an environment typically comprises one or more lighting devices, such as luminaires, each of which, may comprise one or more lamps such as LED lamps that emit configurable illumination into the environment. Where a lighting device comprises multiple lamps, these may, in some cases, be independently controllable at least to some extent. In order to configure or control the lamps across the lighting device(s), they may be connected (e.g. wirelessly or by wired means) to a control mechanism, such as a bridge (e.g. lighting bridge, or home automation server) or other central lighting controller. Thus there may be formed a lighting network in which network nodes are e.g. lamps or sets of lamps, or lighting devices or sets of lighting devices.

The lighting network may have a star topology, whereby the bridge communicates with all nodes directly, a mesh topology, whereby nodes relay control signals to the bridge from other nodes and vice versa, or any other suitable network topology e.g. based on a combination of star and mesh-like connections. The network may also comprise other types of node, such as dedicated controllers, routers, switches etc.

Mood setting is a key element in modern lighting systems and can be achieved by means of lighting "scenes". Each scene is defined by a respective set of configuration data (scene data set) for a group of lamps that belong to that scene, i.e. to which that scene data set relates. The lamp(s) may be located within a single lighting device (or luminaire), or spread across multiple lighting devices. The scene data set contains information on which lamps belong to the scene and defines one or more illumination settings for those lamps. E.g. color setting(s) and/or brightness setting(s), such as a color point and/or a brightness at which each of the lamps is set. Settings in a scene data set may be global (applying to all lamps in the group), individual (applying to only a single lamp in the group), or somewhere in between (applying to a subset of lamps). Users can have multiple scenes configured for each of the possible moods they want to represent (or other ambiance-creating scenarios), and select between them as desired.

From a technological point of view this is enabled not only by the lighting capabilities of the lamps but also by a smart system that can control them according to inputs from users and which communicates internally using a wired (e.g. DMX, DALI) or wireless (e.g. ZigBee, Wi-Fi, Bluetooth) mechanism. Due to this a user can transfer, with minimum effort, the desired configuration or scene recall to all the involved elements. This is referred to in the art as "connected lighting".

A device that cannot be communicated with, e.g. because its power is turned off, will not change its illumination state based on the most recent inputs from the controller or bridge. Ultimately, this may result in the stored most-recent state of the lighting device being out of date when the device becomes responsive once again (e.g. by having power restored to the device).

SUMMARY

A problem in connected lighting is that the devices that belong to a lighting network, and which thus might be part of scenes, can become detached from a scene. This can occur, for example, if they are not powered when new commands are transmitted, or due to an internal malfunction such that they cannot communicate or act upon those commands. In the case of a device that is not powered, this can be because the power connection that it requires has been removed (e.g. a wall switch has been flipped off for the lighting device), or its internal battery source has been depleted (for a battery powered lamp).

Some existing types of lighting device are able to retrieve their last known state from an internal memory upon restoring power and revert to that state for the lighting settings to be output. Similarly, some lighting devices have a default lighting setting which is output upon restoring power (e.g. bright white illumination). Both of these actions can result in the lighting device standing out from the scene being output by any surrounding devices, and ultimately acting to disrupt the current scene when its power is restored. This is therefore not beneficial when a lighting device comprising one or more lamps, upon being powered on, should form part of a scene in a manner other than the last known state.

It has been realized that the above mentioned problem can be solved by the lighting device polling one or more of the surrounding or neighboring lighting devices for information about the current lighting state of the lighting system. The first lighting device, being the lighting device that was previously dormant and has since become active, determines whether the neighboring lighting device(s) are part of a lighting scene being output by the lighting system. If so, the first lighting device can then determine information about the lighting scene based on that polling. The first lighting device determines whether it itself is supposed to be part of the lighting scene being output by the one or more neighboring devices. For example, this may be done by consulting information about different scenes stored locally at the first lighting device and determining whether it has ever been provided with specific settings for the lighting scene currently being output at the neighboring devices. Thus, based on the determined scene at the neighboring lighting devices and the determination that the first lighting device is supposed to be part of that lighting scene, the first lighting device can ascertain one or more lighting settings of the first lighting device and a corresponding light output to be rendered in order to join the current scene. In embodiments the dormant state may be an off-state or a standby state.

Hence, according to a first aspect disclosed herein, there is provided a first lighting device for use in a lighting system, the lighting system comprising one or more lighting devices for illuminating an environment, each lighting device comprising at least one lamp controllable to emit configurable illumination, the first lighting device is configured to perform, upon becoming active from a dormant state, the operations of: polling one or more neighboring lighting devices to determine whether they are part of a lighting scene being output by the lighting system and if so determining information about the lighting scene based on said polling; determining whether the first lighting device is part of the lighting scene; and based on the determined scene and the determination that the first lighting device is part of that lighting scene, ascertaining one or more lighting settings of the first lighting device and a light output to be rendered by the lighting device in order to join the scene.

In embodiments the dormant state may be an off-state or a standby state.

In embodiments the first lighting device may comprise a luminaire or the individual lamp.

In embodiments, the first lighting device is configured to perform the operations of: polling the one or more neighboring lighting devices to determine the light output of the one or more neighboring lighting devices; based on this additional information, estimating a position of the first lighting device within the lighting scene, and ascertaining the one or more lighting settings of the first lighting device and the light output to be rendered by the first lighting device in order to join the scene additionally based on the first lighting device's estimated position within the scene.

In embodiments, the first lighting device is configured to perform the operations of: retrieving information about a relative positioning of the first lighting device within a group of lighting devices which also comprises the one or more neighboring lighting devices; based on this further additional information, estimating a position of the first lighting device within the lighting scene, and ascertaining the one or more lighting settings of the first lighting device and the light output to be rendered by the first lighting device in order to join the scene additionally based on the first lighting device's estimated position within the scene.

In embodiments, the first lighting device is configured, in response to determining the light output of each of the one or more neighboring lighting devices, to ascertaining the light output by computing an average color state of the neighboring lighting devices' color states and an average brightness state of the neighboring lighting devices' brightness states.

In embodiments, said polling is performed via a transceiver of the first lighting device configured to transmit queries to, and receive state information from, one or more neighboring lighting devices.

In embodiments, the state information of the one or more neighboring lighting devices comprises any of a lighting scene, a light output, a color state, a brightness state, a saturation level, a color temperature, etc.

In embodiments, the one or more neighboring lighting devices are polled via one or more other components of the lighting system.

In embodiments, said other component of the lighting system is a lighting bridge to which the lighting device is connected.

In embodiments, said other component of the lighting system is a central lighting controller of the lighting system.

In embodiments, the polling is carried out via a communications protocol of any of ZigBee, Wi-Fi, Bluetooth.

According to a second aspect disclosed herein, there is provided a method for adding a first lighting device to a lighting scene of a lighting system upon the first lighting device becoming active from a dormant state, the lighting system comprising a plurality of lighting devices for illuminating an environment, each lighting device comprising at least one lamp controllable to emit configurable illumination, the first lighting device is configured to perform the method comprising: polling one or more neighboring lighting devices to determine whether they are part of a lighting scene being output by the lighting system and if so determining information about the lighting scene the one or more neighboring lighting devices are part of; determining whether the first lighting device is part of the lighting scene; and based on the determined scene and the determination that the first lighting device is part of that lighting scene, ascertaining one or more lighting settings of the first lighting device and a light output to be rendered by the lighting device in order to join the scene.

In embodiments, the method comprises: polling the neighboring lighting devices to determine the light output of the one or more neighboring lighting devices; based on this additional information, estimating a position of the first lighting device within the lighting scene, and ascertaining the one or more lighting settings of the first lighting device and the light output to be rendered by the first lighting device in order to join the scene additionally based on the first lighting device's estimated position within the scene.

In embodiments, the method comprises, retrieving information about a relative positioning of the first lighting device within a group of lighting devices which also comprises the one or more neighboring lighting devices; based on this further additional information, estimating a position of the first lighting device within the lighting scene, and ascertaining the one or more lighting settings of the first lighting device and the light output to be rendered by the first lighting device in order to join the scene additionally based on the first lighting device's estimated position within the scene.

In embodiments, the method comprises, in response to determining the light output of each of the one or more neighboring lighting devices, ascertaining the appropriate light output by computing an average color state of the neighboring lighting devices' color states and an average brightness state of the neighboring lighting devices' brightness states.

In embodiments, the method comprises polling the one or more neighboring lighting devices via one or more other components of the lighting system In embodiments, the method comprises polling via a transceiver of the first lighting device configured to transmit queries to, and receive state information from, one or more neighboring lighting devices.

In embodiments, the method comprises receiving state information of the one or more neighboring lighting devices comprising any of a lighting scene, a light output, a color state, a brightness state, a saturation level, a color temperature, etc.

In embodiments, the method comprising polling via one or more other components of the lighting system where said other component of the lighting system is a lighting bridge to which the lighting device is connected.

In embodiments, the method comprising polling via one or more other components of the lighting system where said other component of the lighting system is a central lighting controller of the lighting system.

According to a third aspect disclosed herein, there is provided a computer program product comprising code embodied on computer-readable storage and configured so as when run on a computer system to perform the operations of the first lighting device of any of claims 1 to 10.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Smart lights need to be powered to be able to be controlled through a control application or light controller. However, many people still use wall switches to turn lights on and off, which consequently results in lights not being powered for some amount of time. Some smart lighting products allow users to have their smart lighting return to the previous state when they are switched back on (i.e. when power is restored to the lighting device). The problem is that a user may change the light settings of a group of related lights, the group including a lighting device that is switched off, which therefore results in experiencing incorrect light settings when that lighting device is subsequently switched on. For example, the lighting scene output by the group could have been changed, but the light that was off would not have received the new information for the new scene. Thus the now powered on lighting device, not having been powered on when the new light settings where set by the user, may for example return to a previous light setting which is now out of date and ultimately incorrect.

One problem is that the smart lighting devices need to be continuously powered on to be controllable. As soon as power is switched off, the lighting device does not receive any wireless control messages. Since many smart lighting devices are retrofitted lighting solutions, many people place the lighting devices within the lighting system with a wall switch in between. It has been noticed that it is difficult to change the behavior of people so that they no longer use their original wall switches. Therefore, a lot of people experience the above problem where they themselves, or a family member, often switch off the power to the smart lighting devices from habit. When they restore power to the lighting devices the lighting devices typically return to a pre-defined light setting. For example, this may be a default bright white output (similar to that output when a new light is switched on for the first time), or the state the lighting device was in before the power was switched off.

One of the issues with the above mentioned 'return to previous state' behavior is that a user may have multiple lighting devices in a room. Not all of these lighting devices may be switched on and off by the same light switch. This means that when the user activates a lighting scene, some of his lights may be activated to output this new scene, but lights that are powered off will not output this scene. When the user then switches the lights on it either goes to the pre-defined light state, or returns to the previous state, which is no longer valid, because the lights have changed to another scene.

Similarly, it may be that the user is running a dynamic scene. For example, the user may have started a scene which slowly switches the illumination on or off over a period of time (e.g. they may gradually dim up or dim down), or slowly change colors. If one lamp is switched off, and later switched back on, it will not be up to date with the latest state of the other lighting devices in the group and therefore be outputting the wrong lighting.

The inventors have realized that a way to solve the above stated problem is for the lighting device which has been switched on to poll neighboring lighting devices to determine what its own settings should be. That is to say, upon powering-on the lighting device will ask one or more neighboring lighting device(s) to determine whether it should adapt its own output to join a current active scene.

Figure 1:
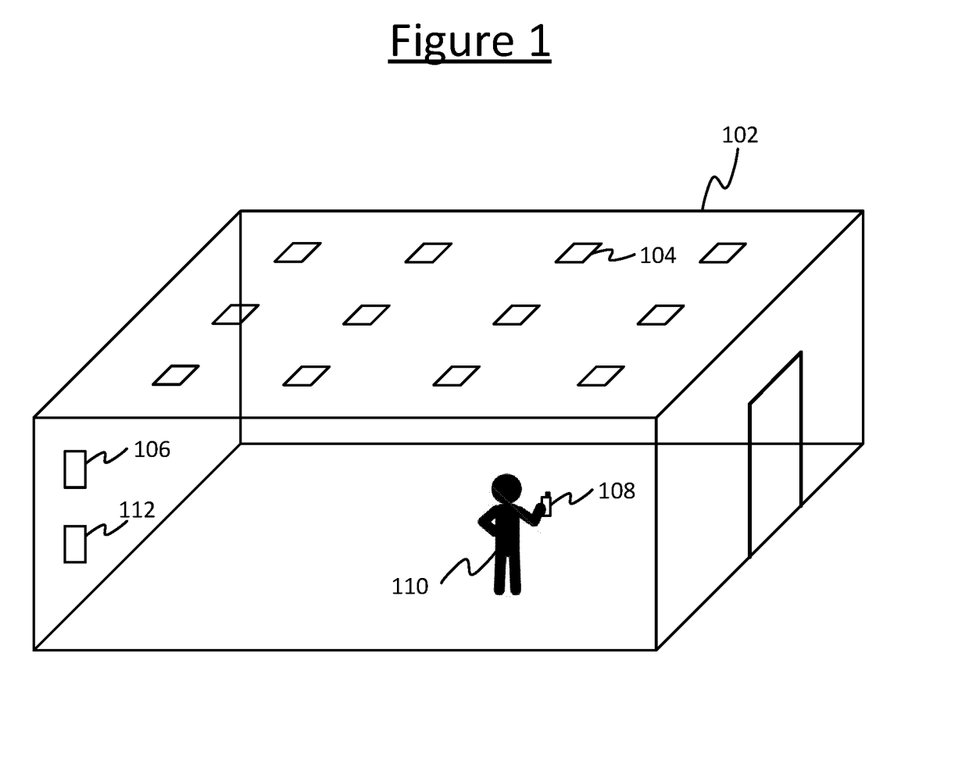
FIG. 1 shows a connected lighting system installed in an environment.

FIG. 1 shows a connected lighting system installed in an environment 102 in relation to which the disclosed techniques may be implemented. Connected lighting systems typically consist of a central network element 106, for example a bridge or hub, wirelessly controllable lighting devices 104, and user interface (UI) devices in various forms e.g. switches 112, sensors and mobiles devices 108. The bridge 106 may be connected to a router (not shown) and the lighting device 104 to which it transmits and receives signals (e.g. commands, status reports, and other messages). The bridge 106 may be capable of running schedules and home automation rules. In this way the bridge 106 may act as the intelligence of the system and provide the processing for the lighting system. The different types of UI devices may all be connected to the bridge 106 in order to actuate the lights. In some connected lighting systems the bridge 106 may be a 'dumb' bridge, used to provide a network backbone to which the lighting devices and UI devices are connected, but without the ability to coordinate the system. In this configuration, a client application on one of the UI devices such as a mobile user device may take on the control type processing function. Alternatively or additionally, the lighting devices themselves may perform certain control functions in a distributed manner. For example, the lighting device may store a certain amount of information locally to enable it to operate without always being connected to the control device via the system. For example if the mobile device being used to control the lighting system should run out of battery, be put into a sleep mode, or the control application enter a background mode, the lighting system may still continue to output the previously set lighting state (e.g. continue to progress through a dynamic lighting scene etc.). Philips Hue is an example of a connected lighting system.

The one or more lighting devices 104 installed in an environment 102 are arranged to emit light in order to illuminate that environment 102. The environment 102 may be an indoor space such as one or more rooms or corridors, an outdoor space such as a park or garden, a partially covered space such as a stadium or gazebo, any other type of space such as an interior of a vehicle, or any combination of these.

Each of the lighting devices 104 comprises at least one respective lamp. Each of the one or more lamps may be an LED-based lamp, gas-discharge lamp or filament bulb for example. The lighting device may also include any associated housing or support for the one or more lamps, or may refer to just a single lamp alone. Each of the lighting devices 104 may take any suitable form such as a ceiling or wall mounted lighting device, a free standing lighting device, a wall washer, a less conventional form such as a lighting device built into a surface or an item of furniture, or any other type of illumination device for emitting illumination into the environment 102 so as to illuminate the environment 102.

One example of a UI device useable by a user 110 to control the lighting system is a user terminal 108. For example the user terminal 108 may take the form of a mobile user device such as a smartphone, tablet or laptop, or a dedicated remote control unit for the lighting system; or alternatively the user terminal 108 could be a non-mobile terminal such as a desktop computer or a wall-panel. The user terminal 108 can be mains powered, battery powered, or use energy-harvesting techniques to supply its energy. The user terminal 108 is configured to be able to control the illumination emitted by one or more of the lighting devices 104 in the lighting system. This includes being able to control the output of the one or more lighting devices. For example, controlling the color of the illumination, the brightness of the illumination, the grouping of the lighting devices, the lighting scene output by the lighting device(s), and one or more other properties such as an overall intensity or a dynamic (time-varying) effect in the illumination. The user terminal 108 may or may not be required to be present in the environment 102 in order to control the lighting system. The lighting system may be controllable from a remote location where the lighting system and e.g. the mobile user device are both connected across a common network, for example the Internet.

The UI devices may also comprise one or more other user interface type network elements such as switch 112. These lighting network elements may serve to provide extra functionalities beyond the actual illumination. For example switches 112 and other such network elements like sensors can be used to provide additional controls for the lighting devices 104. It is this type of switch user interface which can cause the above discussed problem of switching off the illumination from the lighting device(s) in a way other than through e.g. a dedicated control device such as a mobile user device and dedicated application thereon. A switch 112 may thus have the added, and not always intended, function of not only turning off the illumination but also turning off the power supply to the lighting device 104.

Figure 2:
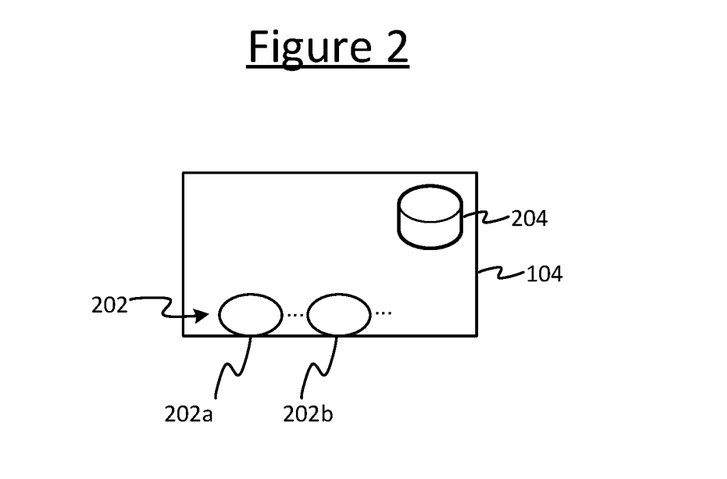
FIG. 2 shows a lighting device.

FIG. 2 shows a lighting device 104. The lighting device 104 comprises one or more controllable lamps 202, each configured to emit illumination. The illumination emitted by the lighting device 104 is the aggregate illumination emitted by its one or more lamp(s). Two lamps 202a, and 202b are shown in FIG. 2, but this is simply for the purpose of illustration and to assist in explaining the invention. A controllable lamp 202 is controllable to change at least one illumination characteristic (e.g. color state, brightness state, etc.) of its emitted illumination.

When a given lighting device 104 comprises multiple controllable lamps 202, their illumination characteristic(s) may be independently controllable. I.e. in this example, the illumination characteristic of lamp 202a is controllable independently of lamp 202b; and lamp 202b is controllable independently of lamp 202a. Alternatively, the illumination characteristic(s) of the plurality of lamps may not be controllable independently of each other, so that the illumination characteristic(s) can only be changed for all of the lamps 202 together. Alternatively, the characteristics may be partially independent e.g. it may be possible to control some characteristics of lamp 202a independently of lamp 202b, but not other characteristics. Different illumination characteristics may have different levels of independence, e.g. one type of characteristic may be fully or partially independently controllable and another may not be independently controllable or may be partially independent but in a different way. For lighting devices comprising more than two controllable lamps any combination of these control configurations may be possible.

The lighting device 104 also comprises an internal memory 204. Internal memory 204 may be used to store information about lighting scene(s) and lighting settings for execution by the one or more lamps 205 of the lighting device 104. For example, the first lighting device of the present invention may check whether it has any light settings associated with a certain lighting scene once it is determined that a lighting scene is being output by one or more neighboring lighting devices. This may be checked by comparing a unique identifier of the lighting scene against a list of lighting scene identifiers for which the first lighting device has stored settings. If the first lighting device has a light setting associated to that scene identifier in the storage 204 it may then activate those settings.

Thus, every lighting device 104 may internally store the scene identifier of the latest lighting scene currently activated, and can therefore be able to inform other lighting devices of this activated scene in response to polling from the one or more other lighting devices.

Figure 3:
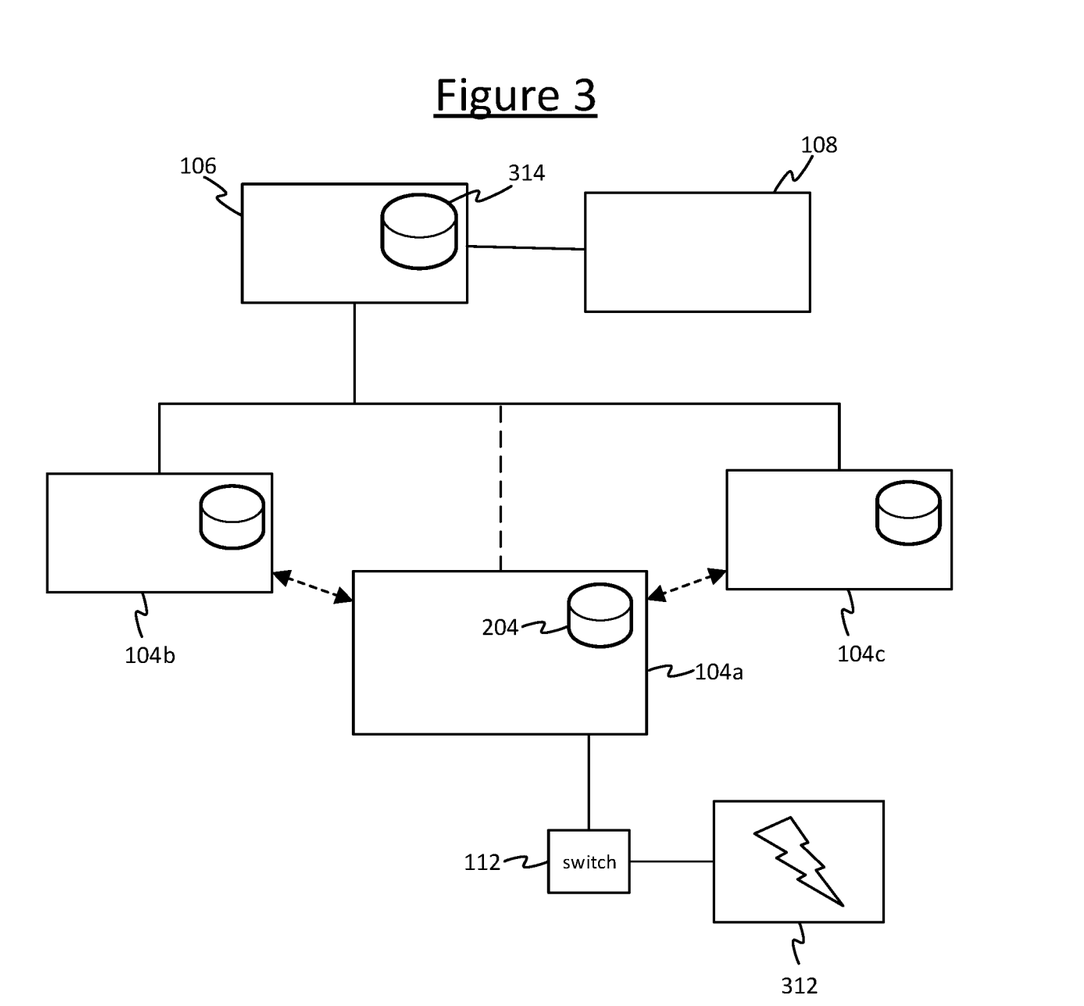
FIG. 3 shows a schematic diagram of the connected lighting system of FIG. 1.

FIG. 3 shows a schematic diagram of the connected lighting system. The lighting system comprises three lighting devices 104a, 104b, and 104c, a bridge device 106, a central lighting controller 108, and a switch 112. Lighting devices 104b and 104c are shown connected to the bridge 106 by solid lines. These solid lines represent the fact that the connection has not been broken by e.g. loss of power and that the lighting output by these neighboring lighting devices is correct. By the term 'correct' it is meant that the rendered light output by these lighting devices in the light output intended to be rendered by these lighting devices and at this time according to the desires of the user 110. Lighting device 104a, also referred to as the first lighting device, is connected to the bridge by a dashed line. This dashed line represents the broken connection with the lighting system as a result of loss of power to the lighting device 104a. It should be understood that upon reconnection of the first lighting device 104a to a power supply 312 the connection with the rest of the lighting system may be restored, but for a period of time prior to re-establishing communication with e.g. the bridge 106 the lighting device may not know what its lighting settings should be. It is over this period of time that the lighting device 104a is configured to operate as in the present invention and poll neighboring lighting devices 104b and 104c for state information.

Switch 112 represents one of the ways the power may be switched off from the lighting device 104a. It should be understood that there are multiple circumstances during which a power supply to one or more lighting devices of a lighting system may be interrupted. For example, switch 112 may be switched off to interrupt the power supply, the lighting device may be unplugged, there may be a power cut, etc. It is not important what occurs to interrupt the power supply to the lighting device 104a, but only that the power has been interrupted for some time during which a control message could have been sent to the lighting device. In yet further scenarios, the power may remain on but a lighting device may be left temporarily unable to update its state for some other reason, e.g. a temporary fault, or because connectivity is interrupted such as by temporary interference.

The system of FIG. 3 is arranged to operate as a connected lighting system as explained above. The bridge 106 may be configured to control the lighting system, store settings in a local memory 314, and perform the processes required to control the light output of the lighting devices in the lighting system. Alternatively the bridge may be a 'dumb' bridge, serving as a backbone network element to which the some or all of the lighting devices are connected to. It should be understood that the bridge 106 could operate at any intermediate level between 'dumb' and central controller. That is, where some but not all control processes are performed by the bridge, and some but not all control processes are distributed throughout other components in the lighting system, e.g. one or more of the lighting devices themselves, a mobile user device, etc.

The specific programing of functions such as lighting scenes etc. for the lighting system may be performed via a user interface. The user interface may be implemented in a standalone element such as a wall panel, connected to a central lighting controller, or an integrated part of a control device 108 such as a mobile device etc. as mentioned above. The bridge 106 may also be considered to be a central lighting controller in some network configurations. Control device 108 is shown in FIG. 3 as an example of one of many ways to input control settings for the lighting system. In the illustrated example the control device 108 is shown connected to the bridge 106 only, but in some network configurations the control device 108 may be directly connected to a lighting device of the lighting system instead. In this later configuration the control device would act as a central lighting controller, storing lighting states and settings on a local memory (not shown) and executing the control processes required to operate the lighting system.

Each of the lighting devices 104a, 104b, and 104c of the lighting system may comprise a local memory 204. The local memory may be used to store information such as previous lighting settings and states, and maintain a record of the most recently received state information.

In the present invention, the lighting device 104a is configured to poll neighboring lighting devices 104b and 104c to determine whether the neighboring lighting devices are part of a lighting scene being output by the lighting system. The polling entails the lighting device 104a communicating directly with the neighboring lighting devices to obtain this information. Connections between lighting device 104a and the neighboring lighting devices 104b and 104c respectively are shown in FIG. 3 by dashed lines with arrows at each end to illustrate the bi-directional communication. If the neighboring lighting devices are part of a lighting scene being output, then information may be determined by the lighting device 104a about the lighting scene based on the polling. There are two ways in which this retrieval of information could be implemented. Typically the lighting system will associate an 'identifier' to each scene. This scene identifier is typically a unique string of letters and/or numbers. In an embodiment, each lighting device may store, for each of a plurality of scene identifiers, a set of lighting settings associated with that specific scene identifier. Therefore each lighting device may know, based on receiving a command with a specific scene identifier, which lighting settings should be used to render a light output by that lighting device and join the scene. Thus any controller that wants to activate a specific lighting scene can send the scene identifier through the network. Subsequently all the lighting devices which receive this scene identifier may check whether they have any light settings associated to this unique combination. If they do have a light setting associated to that scene identifier the lighting device will activate those settings. Therefore in the present invention, every lighting device may also internally store the latest scene identifier it has activated, and can thus inform another lighting device what was the last activated scene in response to polling.

A similar principle can be used with a central controller e.g. a bridge or hub, through which all of the scene commands are sent, in the case of a centralized network. In this implementation the neighboring lighting devices may retrieve the current lighting scene identifier from the central controller of the centralized network and then pass this on in response to the polling to the lighting device 104a. Additionally the neighboring lighting device(s) may provide information on what 'position' or stage the scene is in, for example in a dynamic scene which changes over time. That is to say, the first lighting device implements polling the one or more neighboring lighting devices and receives information via said neighboring lighting device(s) from one or more other components of the lighting system. For example, the central lighting controller, or a series of other neighboring lighting devices, etc. Typically the central lighting controller may have knowledge of which lighting points (i.e. lighting devices within the lighting system, or lighting devices within a group of lighting devices of the system), are part of a specific lighting scene. Similarly, typically the one or more individual lighting devices will know which lighting scenes they are part of.

For example, should the central controller have become unresponsive and need re-booting, it may take a number of minutes (e.g. one, two, or three minutes), for the first lighting device to re-connect to the controller. In this case for example it is therefore advantageous to be able to retrieve lighting scene identifiers, and any available timing information for a dynamic scene, from a still responsive neighboring lighting device(s).

In embodiments the first lighting device, in response to polling the one or more neighboring lighting devices to determine the light output of each neighboring lighting device, may mirror the light output of the one or more neighboring lighting devices. In this instance the first lighting device may determine that it is part of a group of lighting devices including one or more neighboring lighting devices, but that the lighting scene identifier is not known, or that specific settings information associated with a provided scene identifier is not available. Thus an educated guess is made as to what the first lighting device should be doing.

In another embodiment the first lighting device, in response to polling the one or more neighboring lighting devices, may calculate an average of the light output settings of a plurality of the neighboring lighting devices. For example settings at the neighboring lighting devices like a brightness state, a color state, etc. may have their values averaged to obtain suitable lighting settings to be rendered by the first lighting device to produce a light output such that the first lighting device can join the scene. For example, this may occur if the first lighting device determines that it is part of a group of lighting devices including one or more neighboring lighting devices, but that the lighting scene identifier is not known, or that specific information associated with a provided scene identifier is not available. Thus similarly to the above described embodiment, an educated guess may be made as to what the first lighting device should be doing.

In another embodiment, the first lighting device may be aware of detail about the group of lighting devices it belongs to, for example relative positioning. Given this information, the first lighting device may implement an averaging of the light output of the neighboring lighting devices in proportion to the first lighting devices' relative positioning with respect to the neighboring lighting devices.

In another embodiment the first lighting device may have knowledge of an overall light output for a lighting scene (for example a color scale and brightness scale for the whole scene), but may not know its own specific settings. By polling neighboring lighting devices, the first lighting device may be able to determine a likely light output which it should render (e.g. by deducing a gap in the colors and brightness of the scene not covered by any of the neighboring lighting devices), in order to join the scene. By using additional information including the relative positioning of the lighting devices in the group comprising the first lighting device and the one or more neighboring lighting device(s), it may be possible to make a more accurate determination of the part of the scene the first lighting device is responsible for rendering.

The first lighting device performs the polling of neighboring lighting devices via a transceiver of the first lighting device which is configured to transmit queries to, and receive state information from, the one or more neighboring lighting devices.

It should be understood that the state information of the one or more neighboring lighting devices can comprises any combination of a lighting scene, a light output, a color state, a brightness state, a saturation level, a color temperature, etc. The polling may be carried out using any one of communications protocols ZigBee, Bluetooth, Wi-Fi, or any combination thereof, to relay commands and lightning state information between elements of the connected lighting system.

An example use case for the present invention is described below.

A user turns on a scene called 'romance' which requires lighting devices A, B and C to provide red light. However, lighting device A is turned off when the scene is set. Upon power being restored to lighting device A (e.g. by the user flipping a physical wall switch) lighting device A may match its output to lamps B and C (which are providing the romance scene lighting).

The lighting device can check upon boot up, via e.g. ZigBee, with one or more neighboring lighting devices for the state the lighting device should go to. This may assume that lighting devices are grouped in the lighting system or the lighting device may have prior knowledge of this fact. Various algorithms can be conceived of for how the lighting device should merge with the other neighboring lighting devices. For example, it may either adopt the exact light state of one of the neighboring lighting devices. Alternatively, it may get the light states from all neighboring lighting devices and compute what its own values should be (e.g., an average of the other color and brightness settings, or a complementary color). Alternatively, the lighting device 104a retrieves a scene identifier from the neighboring lighting devices and consults a local memory for its own settings for said scene. All of these implementation variations comprise a polling action of neighboring lighting devices, some with various knowledge of the lighting system set-up, to ascertain one or more lighting settings of the lighting device and determine a light output to be rendered in order to join the lighting scene.

Embodiments are described in the context of a system architecture, in which communication is conducted using the ZigBee wireless protocol via a main control device known as the bridge. For example, the Philips Hue family of products are based on this architecture. This is exemplary, and the subject matter can be applied to other types of architecture (see below). For example, communication within the lighting system may be based on Bluetooth, Wi-Fi, etc.

It will be appreciated that the above embodiments have been described only by way of example. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first lighting device for use in a lighting system, the lighting system comprising one or more lighting devices for illuminating an environment, each lighting device comprising at least one lamp controllable to emit configurable illumination, the first lighting device is configured to perform, upon becoming active from a dormant state, the operations of:
   polling one or more neighboring lighting devices of the one or more lighting devices to determine whether they are part of a lighting scene being output by the lighting system;
   polling the one or more neighboring lighting devices to determine the light output of the one or more neighboring lighting devices, thereby determining information about the lighting scene, said information comprising at least one or more illumination settings;
   determining whether the first lighting device is part of the lighting scene being output by the lighting system;
   based on the determined light output of the one or more neighboring lighting devices estimating a contribution of the first lighting device to the lighting scene; and
   based on the determined information about the lighting scene, the determination that the first lighting device is part of that lighting scene and the first lighting device's estimated contribution to the lighting scene, ascertaining one or more lighting settings of the first lighting device and a light output to be rendered by the first lighting device in order to join the lighting scene.

2. The first lighting device according to claim 1, wherein the first lighting device is configured to perform the operations of:

retrieving information about a relative position of the first lighting device within a group of lighting devices which also comprises the one or more neighboring lighting devices;

based on this retrieved information, estimating a position of the first lighting device within the lighting scene, and ascertaining the one or more lighting settings of the first lighting device and the light output to be rendered by the first lighting device in order to join the lighting scene additionally based on the first lighting device's estimated position within the lighting scene.

3. The first lighting device according to claim 1, wherein the first lighting device is configured, in response to determining the light output of each of the one or more neighboring lighting devices, to ascertaining the light output by computing an average color state of the neighboring lighting devices' color states and/or an average brightness state of the neighboring lighting devices' brightness states.

4. The first lighting device according to claim 1, wherein said polling is performed via a transceiver of the first lighting device configured to transmit queries to, and receive state information from, one or more neighboring lighting devices.

5. The first lighting device according to claim 4, wherein the state information of the one or more neighboring lighting devices comprises any of a lighting scene, a light output, a color state, a brightness state, a saturation level, a color temperature, etc.

6. The first lighting device according to claim 1, wherein the one or more neighboring lighting devices are polled via one or more other components of the lighting system.

7. The first lighting device according to claim 6, wherein said one or more other components of the lighting system is a lighting bridge to which the first lighting device is connected.

8. The first lighting device according to claim 6, wherein said one or more other components of the lighting system is a central lighting controller (108) of the lighting system.

9. The first lighting device according to claim 1, wherein the polling is carried out via a communications protocol of any of ZigBee, Wi-Fi, Bluetooth.

10. A method for adding a first lighting device to a lighting scene of a lighting system upon the first lighting device becoming active from a dormant state, the lighting system comprising a plurality of lighting devices for illuminating an environment, each lighting device comprising at least one lamp controllable to emit configurable illumination, the first lighting device is configured to perform the method comprising:

polling one or more neighboring lighting devices of the plurality of lighting devices to determine whether they are part of a lighting scene being output by the lighting system and determining information about the lighting scene based on said polling, said information comprising at least one or more illumination settings;

polling the one or more neighboring lighting devices to determine the light output of the one or more neighboring lighting devices, thereby determining whether the first lighting device is part of the lighting scene being output by the lighting system; and based on the determined light output of the one or more neighboring lighting devices estimating a contribution of the first lighting device to the lighting scene;

based on the determined scene, the determination that the first lighting device is part of that lighting scene and the first lighting device's estimated contribution to the lighting scene, ascertaining one or more lighting settings of the first lighting device and a light output to be rendered by the first lighting device in order to join the lighting scene.

11. The method of claim 10, wherein the method comprises, in response to determining the light output of each of the one or more neighboring lighting devices, ascertaining the appropriate light output by computing an average color state of the neighboring lighting devices' color states and/or an average brightness state of the neighboring lighting devices' brightness states.

12. The method of claim 10, wherein the method comprises the polling the one or more neighboring lighting devices via one or more other components of the lighting system.

13. A computer program product comprising code embodied on non-transitory computer-readable storage, which, when executed by a computer, cause the computer to carry out the method of claim 10.

* * * * *